Jan. 30, 1951 W. STERN 2,540,058
SHANK SLOTTER
Filed July 23, 1948 4 Sheets-Sheet 1

INVENTOR.
William Stern
BY
Moore, Olson & Trexler
Attys.

Jan. 30, 1951 W. STERN 2,540,058
SHANK SLOTTER
Filed July 23, 1948 4 Sheets-Sheet 2
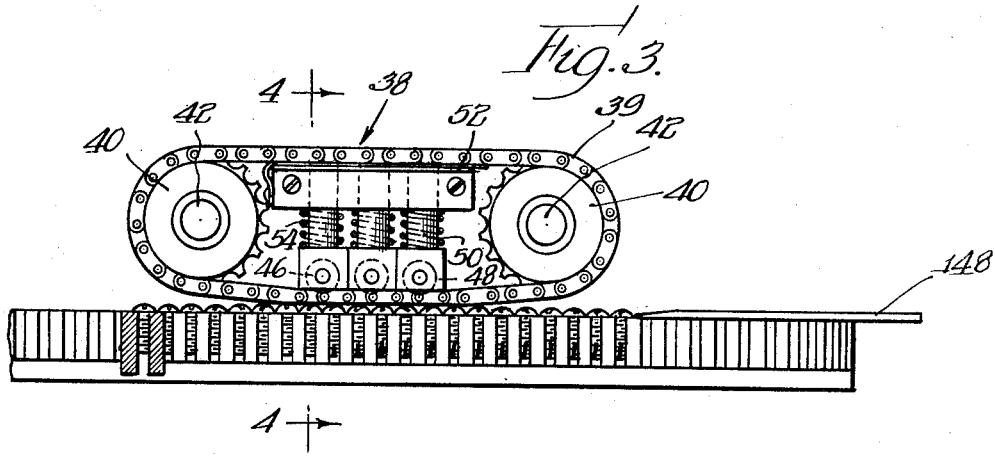
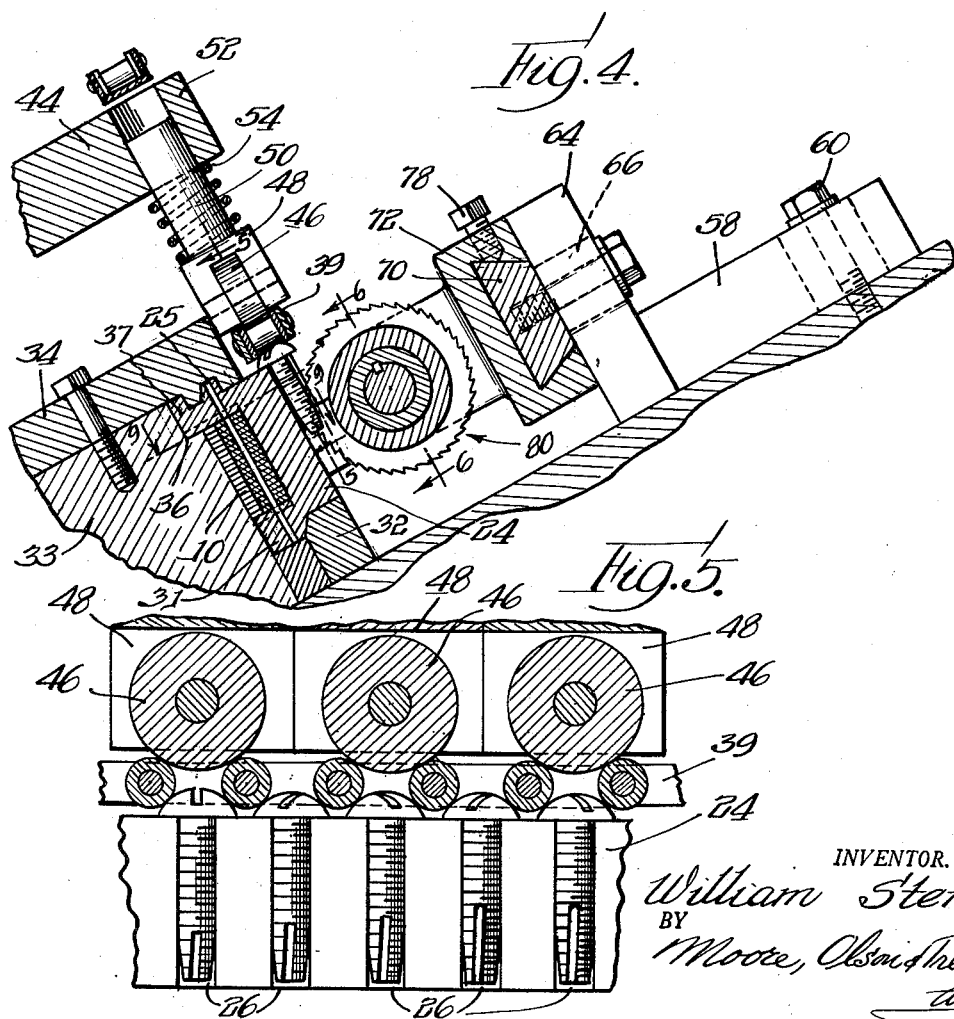
INVENTOR.
William Stern
BY
Moore, Olson & Trexler
Attys Jan. 30, 1951 W. STERN 2,540,058
SHANK SLOTTER
Filed July 23, 1948 4 Sheets-Sheet 3
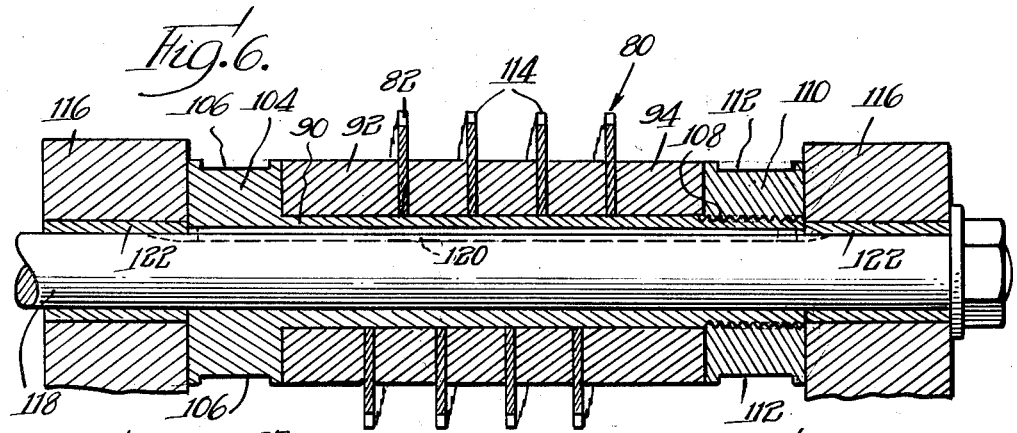
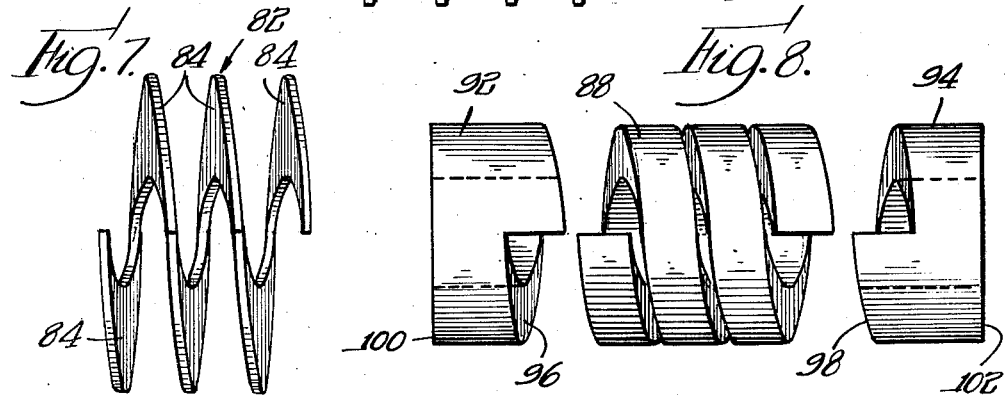
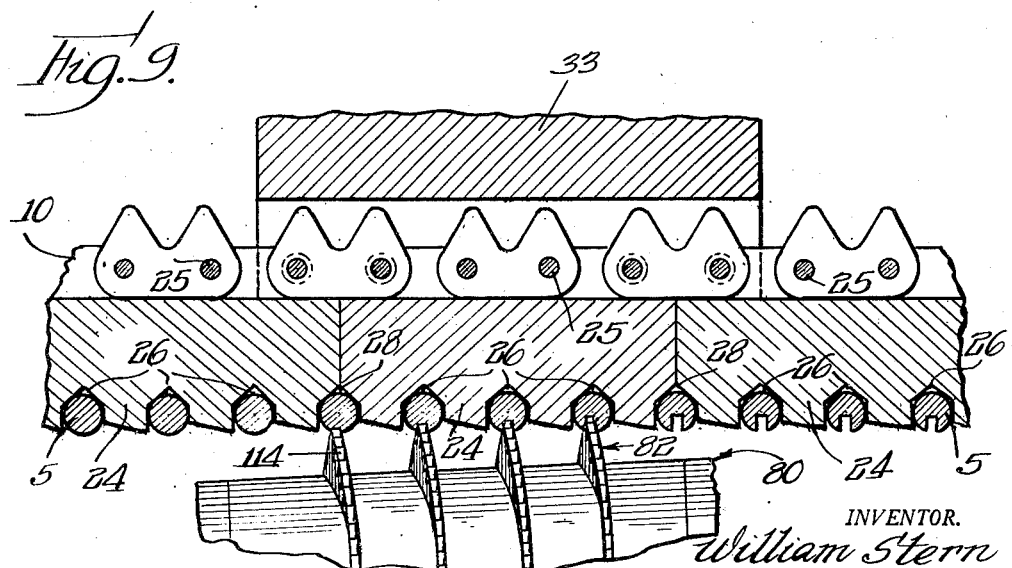
INVENTOR.
William Stern
BY
Moore, Olson & Trexler
Atty Jan. 30, 1951 W. STERN 2,540,058
SHANK SLOTTER
Filed July 23, 1948 4 Sheets-Sheet 4
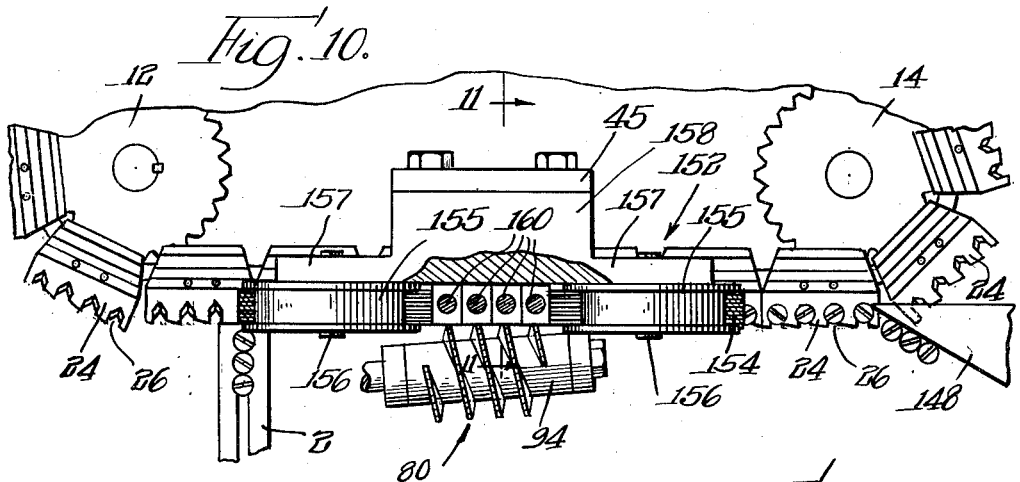
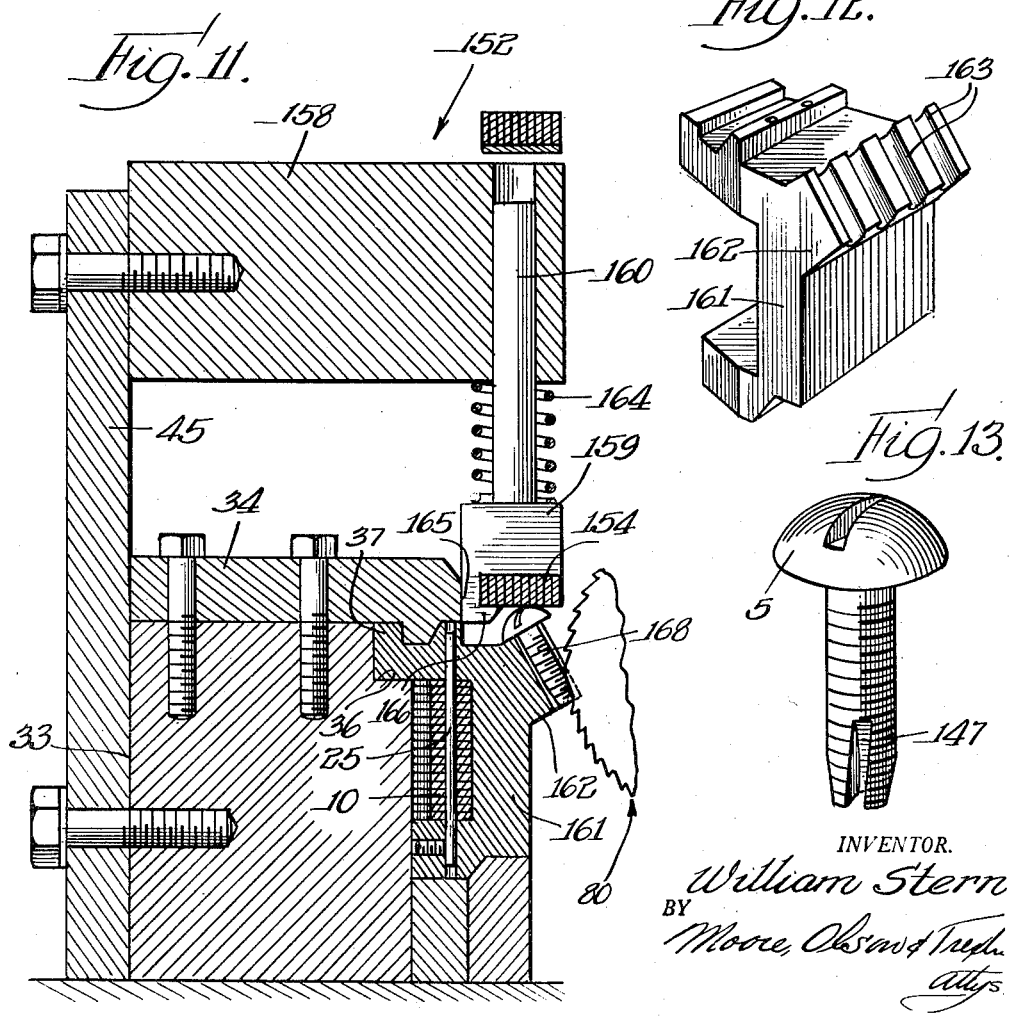
INVENTOR.
William Stern
BY Moore, Olson & Trexler
Attys Patented Jan. 30, 1951

2,540,058

UNITED STATES PATENT OFFICE 2,540,058

SHANK SLOTTER

William Stern, Park Ridge, Ill., assignor to Illinois Tool Works, Chicago, Ill., a corporation of Illinois Application July 23, 1948, Serial No. 40,310

25 Claims. (Cl. 10—2)

1

This invention relates to an article working machine or mechanism, and more particularly to a mechanism for slotting the shanks of screws, although the invention may be employed in a machine for slotting screw heads.

A principal object of the invention is to provide a screw slotting machine in which the screws are fed continuously from a delivery point to a discharge point and material is progressively removed from each screw as it moves continuously between those points.

A further object of the invention is to provide in a screw slotting machine a new or improved helical slotting or sawing blade which continuously and progressively removes relatively small increments of material from each screw to form therein a slot of substantial depth, The present invention contemplates the provision of a means for continuously feeding screws past a cutting or sawing blade having its axis of rotation inclined to the path of feed of the screw element and means for supporting each screw element against axial and transverse movement as it is carried by the feeding means past the cutting or sawing blade, Heretofore screw slotting machines, whether for slotting the shanks of thread cutting screws or for slotting the heads of screws, have usually employed a rotating turret, or a reciprocating carrier, intermittently operated or advanced to position a screw into the path of a saw and to hold the screw stationary during the transverse movement of the saw. Such machines, although the parts thereof are operated at a very high speeds, are quite limited in the number of screws per minute which can be slotted. The present invention contemplates the provision of a screw slotting machine in which, although the parts are operated at a relatively slow speed, thereby increasing the life and decreasing the machine maintenance requirements, the capacity of the machine in the number of screws slotted per minute is greatly increased, i. e., from about two hundred screws per minute to about eight hundred screws per minute.

It is another, more general object of the invention to provide a screw slotting machine composed of a minimum of parts, least expensive and most readily adaptable for the interchanging of parts or for adjustment to handle different sizes and types of screws.

Other and further objects and advantages of the invention will be apparent from the following description when taken in connection with the accompanying drawings wherein:

2

Fig. 3 is a fragmentary view in section taken substantially along the line 3—3 of Fig. 1;

Fig. 4 is a fragmentary view in section taken substantially along the line 4—4 of Fig. 3;

Fig. 5 is a fragmentary view in section taken substantially along the line 5—5 of Fig. 4;

Fig. 6 is an enlarged view in section taken substantially along the line 6—6 of Fig. 4;

Fig. 7 is a view in elevation of a screw slotting or sawing blade;

Fig. 8 is a view in elevation of parts forming a holder for the screw slotting blade or saw;

Fig. 9 is an enlarged fragmentary view in horizontal section taken substantially along the line 9—9 of Fig. 4;

Fig. 10 is a fragmentary view partly in plan and partly in section of a modification of the screw hold down mechanism of the machine of Figs. 1 to 9, and also showing a modified form of screw conveyor block;

Fig. 11 is an enlarged view in vertical section taken substantially along the line 11—11 of Fig. 10;

Fig. 12 is a view in perspective of the modified form of screw receiving block as employed with the screw hold down mechanism of Figs. 10 and 11; and Fig. 13 is a view in perspective of a slotted shank, thread cutting screw slotted by the machine embodying the present invention.

Figures 1, 2:
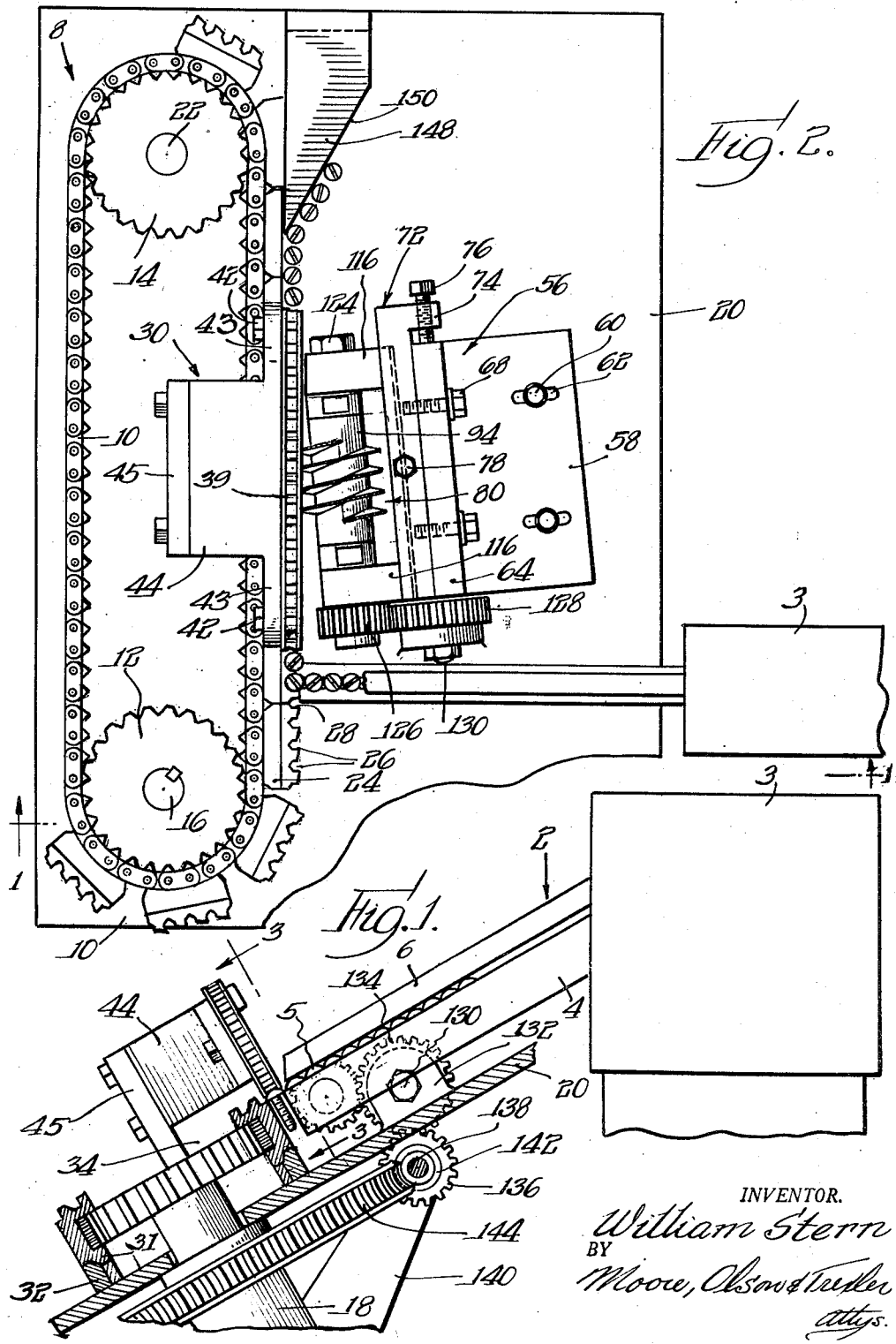
Fig. 1 is a view partly in elevation and partly in vertical section taken along the line 1—1 of Fig. 2.
Fig. 2 is a fragmentary plan view of the machine of Fig. 1.

As shown in the drawings, a machine embodying the present invention may comprise screw feeding means 2 of any usual construction including a screw hopper 3 from which screws or screw blanks 5 are delivered by any suitable mechanism (not shown) to an inclined screw feeding chute 4 formed by spaced bars receiving between them the shanks of the screw elements or blanks and supporting the heads of the screws. A cover bar 6 arranged centrally of the chute and overlying in close relation the heads of the screws in the chute 4 prevents them from becoming tilted and jammed in said chute.

A continuously moving screw carrier 8 comprises a silent chain 10 passing about a drive sprocket or gear 12 and an idler gear or sprocket 14, the sprocket 12 being secured to a drive shaft 16 journaled in a boss 18 upstanding from a suitable support or stand (not shown), the shaft 16 passing through a suitable opening in a bed plate 20 mounted in any convenient manner on said support and stand and inclined, preferably at the same angle as the chute 4. The sprocket 14 is journaled on a stud 22 suitably secured in a boss upstanding from the same support or stand. A continuous series of screw receiving blocks 24 are secured by link pins 25 to the Silent chain 10, each block having a plurality of slots or recesses 26 to receive the shanks of the screws 5 with the heads of the screws resting on the top surfaces of the blocks. Each block has at its opposite ends half recesses or slots 28 to cooperate with the half recess or slot 28 of the adjacent block to form a slot similar to slot 26 and similarly receive the shank of a screw element so that the screw elements received in the blocks from the chute 4 are all equally spaced the length of the chain as it passes the slotting station 30.

The screw carrier blocks 24 have beveled depending portions 31 slidably supported by, and interfitted with the beveled rear edge of a continuous track 32 underlying the entire length of the Silent chain 10. At the slotting station 30 the chain 10 and the screw carrier blocks are also guided and supported against inward movement by a support block 34 having a guide projection received in guideways formed in the tops of the blocks 24. The block 34 is fastened to a mounting block 33 secured to the bed plate 20 and projecting upwardly between the arms of the track 32 and the parallel flights of the chain 10. The block 33 has a recessed guide portion 36 and each block 24 has a complementary upper, rearward flange portion 37 engaging the guide portion 36. The front face of the block 33 is positioned to form, as shown in Fig. 9, a guide surface and a rear support for the links of the chain 10, at the slotting station.

A head engaging hold-down mechanism 38 at the assembling station comprises a roller chain 39 passing over idler sprockets 40 journaled on studs 42 carried by mounting flanges 43 of a block 44 bolted to a bracket 45 upstanding from the bed plate 20. The lower flight of the roller chain 39 passes beneath rollers 46 carried by blocks 48 secured to rods 50 slidably mounted in a forwardly projecting flange 52 of the block 44. Coil springs 54 encircle the rods 50 and are interposed between the flange 52 and the roller carrying blocks 48 so that the springs 54 and blocks 48 and rollers 46 urge the lower flight of the chain 39 downwardly and maintain the roller chain in engagement with the heads of the screws as they pass the slotting station.

The slotting mechanism 56 preferably comprises a first mounting block 58 adjustably secured to the bed plate 20 as by bolts 60 received in slots 62 in the mounting block so that the block 58 may be adjusted toward and from the screw carrier blocks 24 as they are carried by the chain conveyor past the slotting station. The mounting block 58 is provided with an upstanding, perpendicular flange 64 having slots 66 for receiving mounting bolts 68 by means of which a slide guide 70 is adjustably secured to the first mounting block 58 for adjustment in a plane perpendicular to the bed plate and axially of the screws at the slotting station. A generally U-shaped block 72 is slidably mounted on the guide 70, as best seen in Fig. 4, and is provided at one end with an L-shaped bracket portion 74 extending over the end of the upstanding flange 64 of the first mounting block 58. The bracket portion 74 carries an adjusting screw 76 which is threaded thereinto and engages the end of the flange 64 so that by adjustment of the screw 76 the position of the U-shaped block 72 lengthwise of the guide 70 may be determined. The slide block 72 is locked in adjusted position with respect to the guide 70 as by locking screw 78.

The slotting saw 80, best seen in Figs. 6 to 8, comprises a helical saw blade 82 consisting of a plurality of centrally apertured disks 84 each twisted in an axial direction to form a helix, the helices of the plurality of disks being of the same pitch and diameters, so that the disk edges may be aligned to form the complete helical blade. The several disks 84 are then threaded into a spring-like holder 88 which consists of a helix, the spacing between the adjacent convolutions corresponding to the thickness of the disks 84 and the width of the material forming the helical band corresponding to the distance between the adjacent convolutions of the saw blade. The helically twisted disks of the saw blade having been threaded in the proper manner into the resilient helical holder 88, the holder is mounted on a sleeve 90 between collars 92 and 94 having inner faces 96 and 98 in the form of a helix of a single convolution, the outer faces 100 and 102 of the collars 92 and 94 being flat. The sleeve 90 is provided at one end with an integral, enlarged head portion 104 having opposed flat, or chordal surfaces 106. The opposite end of the sleeve 90 is externally threaded as at 108 to receive an internally threaded nut or collar 110 also having opposed flat, or chordal surfaces 112.

The helical disks having been assembled with the helical holder and with the collars 92 and 94 on the sleeve 90, suitable wrenches are engaged with the flat surfaces of the head 104 of the sleeve and the collar 110 and the sleeve and collar rotated relatively so that the resilient holder 88 and the collars 92 and 94 firmly clamp the saw blade on the sleeve and for rotation therewith.

In fabricating the saw, the several disks 84, prior to the formation of the teeth therein, are first sheared and bent into helical form, and then heat treated. After heat treatment they are placed within a suitable helical holder, and drawn to relieve hardening stresses. The several disks 84 are then assembled within the holder 88, as previously described, and after being clamped therein between the arms 116 of the U-shaped block 72 the teeth 114 are ground in the periphery of the several disks to form the saw 82.

A driving shaft 118, carrying a key 120, is inserted into the sleeve 90 and keyed thereto, the shaft being journaled in bearings or bushings 122 in the arms 116 of the block 72. A nut 124 on one end of the shaft and a gear 126 pinned on the other end of the shaft secure it against axial movement. The gear 126 meshes with a gear 128 on a drive shaft 130 journaled in suitable bearing brackets such as 132, shown in Fig. 1. The shaft 130 may be driven by any suitable electric motor or other prime mover (not shown).

A gear 134 on the main drive shaft 130 meshes with a gear 136 on a second shaft 138 journaled in a suitable arm or support 140 carried by the main supporting stand, Fig. 1. The shaft 138 has secured to it a worm 142 which drives a worm wheel 144 affixed on the lower end of the sprocket drive shaft 16 for the chain 10.

In operation, threaded screw elements or blanks are delivered in a continuous succession by the gravity feed chute 4 to the blocks 24 carried by the continuously moving chain conveyor 10 and are received in recesses 26 of the blocks in the same orientation and inclination as they are delivered at the end of the gravity chute, the head of each screw element resting upon an upper exposed surface of a block. The screws are also received in recesses 28 formed by half recesses in adjacent screw blocks so that the screw elements are spaced uniformly of the screw conveyor as they are fed toward, through and beyond the slotting station. As the continuously moving chain conveyor carries the screw elements to the slotting station 30 they are brought beneath the roller chain 39 as illustrated in Fig. 3, the plungers 50 through the rollers 46 serving to depress the central portion of the chain so that portions of the chain on opposite sides of the central portion, and extending to the idler sprockets 40, are inclined, thus permitting gradual introduction of the continuously moving screw elements under the chain and gradually into engagement therewith.

Throughout the slotting station, i. e., the central portion of the chain 39, the heads of the screw elements are engaged by and positioned between adjacent rollers of the chain, as shown in Fig. 5, and the screws thus held against tilting in the recesses of the blocks as the shanks of the screw elements are slotted by the slotting saw. As the screw carrying blocks move through the slotting station, chain 10 and blocks 24 slidably engage the blocks 33 and blocks 34 and are thereby supported against inward movement during the slotting operation.

The pitch of the saw blade 82 is made equal to the distance between adjacent recesses 26 of the screw receiving blocks and the speed of the chain conveyor 10 is made proportionate to the lead and speed of rotation of the saw blade so that once the screw element has been engaged by the saw blade it will remain in engagement therewith until it has reached the opposite end of the blade. It should be noted that, as shown in Fig. 2, the slotting saw is so mounted that it rotates about an axis which, in a plane transverse to the shanks of the screw elements, is inclined to the path of movement of the screw elements and the leading end of this saw blade is spaced farther from the path of the screw elements than the trailing end. Thus, as the screw elements move continuously past the saw, the saw progressively removes the material from the shank of the screw element, as illustrated in Fig. 9, to provide the final inclined slot 147 in the screw 5, as illustrated in Fig. 13. The angle of tilt of the saw blade with respect to the path of movement of the screws is such that each tooth on the helical saw blade cuts approximately .0015 inch from the shank of the screw.

By this continuous, progressive cutting or forming of the slot in the screw during its movement for a substantial distance, applicant is enabled to perform the cutting operation at a relatively slow rate, hence permitting the saw to be rotated at a relatively slow speed and the screws to be fed at a relatively slow speed. By employing a helical saw blade with a plurality of convolutions and feeding the screws in spaced relation conforming to the pitch or lead of the helical saw blade, applicant is enabled to perform the cutting operation on a number of screws at the same time. The tilting of the saw blade with respect to the path of movement of the screws permits the slots in the screws to be formed by a progressive removal of quite small increments of material so that the life of the saw blade is greatly increased.

By employing a helical saw blade which is of progressively increasing diameter along its length, progressively deeper cuts into the screw heads may be effected with the saw blade holder and the screw conveyor disposed with their axes parallel. Such arrangement may in certain instances be desired so as to avoid the angular disposition of the saw blade holder.

When the screws have been slotted and passed beyond the slotting station they are carried continuously to an extractor means or blade 148 overlying the path of movement of the screw receiving blocks 24. The extractor means or blade 148 has an inclined edge or camming surface 150 extending outwardly at an angle from the path of movement of the screw elements while they are in the block 24. Thus as the screw receiving blocks 24 move continuously at a uniform rate to bring the slotted screw elements into engagement with the camming edge 150, the heads of the screw elements being engaged by that camming edge are progressively moved transversely to the recesses 26 and 28 in the blocks 24 until they are completely released from the blocks and drop therefrom into a suitable receiving pan (not shown) or other receptacle or onto a suitable conveyor (not shown).

In certain instances, wherein the screw heads are relatively small and flat, or otherwise unadapted to removal by a blade such as member 148, a jet of air positioned for action at the location of the blade 148 may be employed.

For the purpose of holding screw elements having certain shaped heads, i. e., flat, countersunk, etc., which would cause the screw elements to be tilted in the receiving recesses of the screw receiving blocks of the conveyor if engaged by the roller chain hold-down 38 of the form shown in Figs. 1 and 3 to 5, applicant has provided the alternative hold-down mechanism 152, Figs. 10 and 11. As shown in these figures, the hold-down mechanism comprises a small Silent chain 154, from which the sprocket engaging teeth have been removed, the chain passing about idler sprockets 155 journaled on studs 156 secured to the end flanges 157 of a block 158 bolted to the bracket 45. As also shown in Figs. 10 and 11, and Fig. 12, the conveyor blocks 161 for the screws are in this instance provided with the receiving screw pockets all inwardly displaced from the ends of the blocks, so that each screw pocket is contained within a single block and will be accurately gauged as to size at all times irrespective of the relative positioning between the blocks. Plunger rods 160 are mounted in vertical apertures in the block 158, and carry chain mounting and guide blocks 159, the plunger rods being mounted in block 158 for movement in a vertical plane so that the chain 154 lies in a horizontal plane and therefore at an angle to the heads of the screw elements received in blocks 161, the blocks 161 having forwardly projecting portions 162 with inclined screw receiving recesses 163 to position the screws at an angle to the horizontal chain 154.

Coil springs 164 corresponding to the coil springs 54 surround the rods 160 and are interposed between the block 158 and the guide blocks 159 to which the plunger rods are secured. The blocks 159 are formed with depending portions 165 and inwardly extending portions 166 forming a guide channel for the rear flight of the Silent chain 154 so that the chain will not be tilted when it engages with the flat head of the screw element 168, as shown in Fig. 11. It should be noted that the downward pressures of the springs 164 are exerted on the forward edge or corner of the head of the screw, so that the shank of the screw element is urged against the rear or back wall surface of the recesses 163 of the blocks 161. At the same time the downward pressures of the springs exerted on the screw heads through the Silent chain conveyor hold the flat heads of the screw elements against the upper surfaces of the screw receiving blocks. It will be evident that screw elements having countersunk or frusto-conical heads will be engaged in like manner by the Silent chain conveyor 154 and similarly held in the recesses 163 of the screw blocks 161.

It is to be understood that the hold-down mechanism as shown in Figs. 10 and 11 is not limited in use to screws having flat or frusto-conical heads but may be also used in a similar manner for holding down screws the heads of which are round, such as the screws 5 illustrated in Figs. 1 to 9, as well as other screws having variously shaped heads.

The term "helical" is used herein in reference to the material working edge of the tool or saw to describe a coil consisting of convolutions conforming generally to a screw thread, as distinguished from a coil such as a watch spring which expands radially outwardly from a center.

It will be apparent from the foregoing description that applicant has provided a screw slotting machine in which the screws are fed continuously from a delivery point to a discharge point and material is progressively removed from each screw as it moves continuously between those points; in a screw slotting machine a new or improved helical slotting or sawing blade which continuously and progressively removes relatively small increments of material from each screw to form therein a slot of substantial depth; a means for continuously feeding screws past a cutting or sawing blade having its axis of rotation inclined to the path of feed of the screw element and means for supporting each screw element against axial and transverse movement as it is carried by the feeding means past the cutting or sawing blade; a screw slotting machine in which, although the parts are operated at a relatively low speed, thereby increasing the life and decreasing the machine maintenance requirements, the capacity of the machine in the number of screws slotted per minute is greatly increased, i. e., from about two hundred to about eight hundred screws per minute, and a screw slotting machine composed of a minimum of parts, least expensive and most readily adaptable for the interchanging of parts or for adjustment to handle different sizes and types of screws.

It will be obvious that changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In an article working apparatus, a rotary working tool having a helical material working edge, a movable article conveyor, a plurality of means for positioning a plurality of articles on said conveyor in predetermined spaced relation in accordance with the lead of the helical working edge of said tool, and means for continuously moving said conveyor in timed relation to the rotative speed of said tool to move said article positioning means successively into predetermined positions of registration with the helical working edge of said tool, whereby spaced articles may be correspondingly moved successively into operative engagement and predetermined registration with said working edge.

2. In an article working apparatus, a rotary working tool having a helical material working edge, a movable article conveyor, means for positioning a plurality of articles for movement by said conveyor in predetermined spaced relation in accordance with the lead of the helical working edge of said tool, and means for moving said conveyor in timed relation to the rotative speed of said tool to move said articles spaced by said positioning means successively into operative engagement and predetermined registration with said working edge.

3. In an article working apparatus as set forth in claim 2, wherein said helical working edge and said article conveyor are disposed for relative approaching movement laterally of the path of movement of the conveyed spaced articles from the point of initial registration of the helical edge of the tool with an article toward the completion of the operative engagement of said helical edge with said article.

4. In an article working apparatus as set forth in claim 3, wherein the disposition of said helical working edge and said article conveyor is such that said relative approaching movement is progressively uniform throughout the operative engagement of said helical working edge with an article.

5. In an article working apparatus as set forth in claim 2, having means for effecting relative adjustment between the helical working edge of said tool and the path of movement of the conveyed articles.

6. In an article working apparatus as set forth in claim 2, in which the axial pitch of the helical working edge of the rotary tool is equal to the distance between articles spaced by said positioning means.

7. In an article working apparatus as set forth in claim 2, wherein the axis of the rotary tool is angularly disposed with respect to the path of movement of the conveyed articles as said articles move past said tool.

8. In an article working apparatus, a rotary working tool having a helical material working edge, an endless conveyor having a plurality of article receivers spaced in accordance with the lead of the helical working edge of said tool, means for delivering articles to the receivers of the conveyor, and means for moving said conveyor in timed relation to the rotative speed of said tool to move said spaced articles successively into operative engagement and predetermined registration with the working edge of said tool.

9. In an article working apparatus as set forth in claim 8, including means for supporting an article against displacement transversely of its path of movement during operative engagement of the tool with the article.

10. In an article working apparatus as set forth in claim 9, wherein the conveyor constitutes an endless flexible structure and the article supporting means comprises means for resisting transverse displacement of the endless flexible conveyor structure.

11. In an apparatus for slotting screw elements, a rotary slotting tool having a helical working edge, a movable conveyor for screw elements, a plurality of screw element receiving means for positioning a plurality of received screw elements on said conveyor in predetermined spaced relation in accordance with the lead of the helical working edge of said slotting tool, and means for moving said conveyor in timed relation to the rotative speed of said slotting tool to move said screw element receiving means successively into predetermined positions of registration with the helical working edge of said slotting tool, whereby spaced screw elements may be correspondingly moved successively into predetermined slotting registration with said working edge.

12. In an apparatus for slotting screw elements as set forth in claim 11, wherein the rotary slotting tool comprises a helical slotting saw structure.

13. In an apparatus for slotting screw elements as set forth in claim 11, wherein the screw element conveyor is an endless conveyor structure.

14. In an apparatus for slotting screw elements as set forth in claim 13, having means for feeding screw elements to the endless conveyor structure in advance of the slotting tool.

15. In an apparatus for slotting screw elements as set forth in claim 13, having means for ejecting screw elements from the conveyor after the elements have been slotted by said tool.

16. In an apparatus for slotting screw elements as set forth in claim 11, wherein the rotary slotting tool is mounted for axial adjustment.

17. In an apparatus for slotting screw elements as set forth in claim 11, having screw element engaging means for restraining a screw element against dislodgement from the conveyor during operative engagement of said screw element with the slotting tool.

18. In an apparatus for slotting screw elements as set forth in claim 17, wherein the restraining means includes an endless flexible screw element engaging member.

19. In an apparatus for slotting screw elements as set forth in claim 11, wherein the screw element receiving means comprises screw element supporting members mounted on the conveyor for receiving and supporting screw elements with their shanks exposed for operative engagement with the helical working edge of said slotting tool.

20. In an apparatus for slotting screw elements, a rotary slotting tool having a helical working edge, an endless conveyor, a plurality of screw element receiving blocks secured to said conveyor for positioning a plurality of received screw elements in predetermined spaced relation in accordance with the lead of the helical working edge of said slotting tool, and means for moving said conveyor continuously at a uniform rate proportionate to the rotative speed of said slotting tool to move the screw element receiving blocks successively into predetermined positions of registration with the helical working edge of said slotting tool, whereby spaced screw elements carried by said blocks may be correspondingly moved successively into predetermined slotting registration with said helical edge of said slotting tool.

21. In an apparatus for slotting screw elements as set forth in claim 20, wherein the screw receiving blocks are provided with shank accommodating grooves and head supporting surfaces.

22. In an apparatus for slotting screw elements as set forth in claim 21, having means for engaging each screw receiving block as it is moved past said slotting tool to prevent lateral movement of said block during operative engagement of the tool with a screw element received in the block.

23. In an apparatus for slotting screw elements as set forth in claim 20, having an idler chain mounted to engage the screw elements as they are moved past said slotting tool to prevent displacement of the screw elements relative to the blocks during the engagement of the screw elements with said tool.

24. In an apparatus for slotting screw elements as set forth in claim 23, having spring urged means for causing the idler chains to engage the screw elements in the screw receiving blocks of the conveyor as the screw elements are carried past the slotting tool.

25. In an apparatus for slotting screw elements as set forth in claim 20, having means adapted to engage the heads of screw elements in said blocks as said blocks are moved past said slotting tool to prevent shifting of said screw elements relative to the blocks during the slotting of said elements by said tool.

WILLIAM STERN.

REFERENCES CITED

The following references are of record in the file of this patent:

UNITED STATES PATENTS

| Number | Name | Date |
| --- | --- | --- |
| 600,544 | Mathein | Mar. 15, 1898 |
| 717,167 | Cheney | Dec. 30, 1902 |
| 1,269,370 | Botenstein | June 11, 1918 |
| 1,510,729 | Weisner | Oct. 7, 1924 |
| 1,538,770 | Wildhaber | May 19, 1925 |
| 1,872,564 | Stimpson | Aug. 16, 1932 |
| 1,893,509 | Stimpson | Jan. 10, 1933 |
| 1,896,199 | Peiseler | Feb. 7, 1933 |